Nov. 22, 1949 R. J. HERBOLD 2,489,223
ANTICOLLISION APPARATUS
Filed June 25, 1946 2 Sheets-Sheet 1
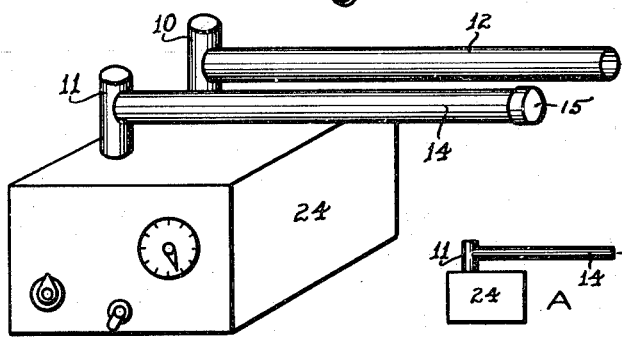
Fig. 1.
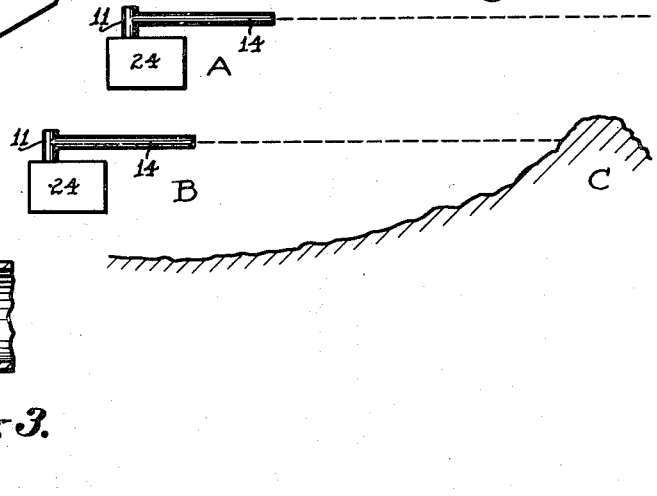
Fig. 2.
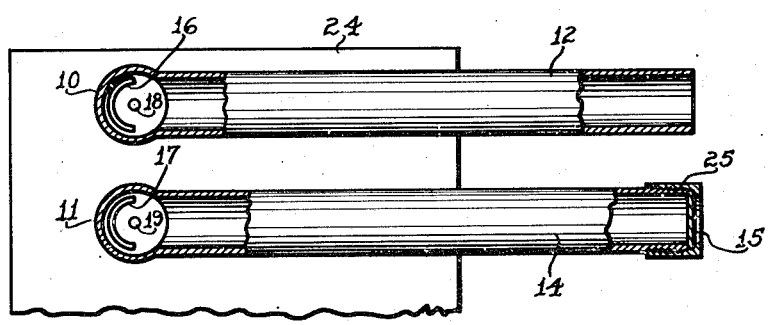
Fig. 3.
Fig. 4.
Witness
Herbert E. Covey
Inventor
Robert J. Herbold
By Clayton R. Jenks
Attorney Nov. 22, 1949     R. J. HERBOLD     2,489,223
ANTICOLLISION APPARATUS Filed June 25, 1946     2 Sheets-Sheet 2

Inventor
Robert J. Herbold
By Clayton D. Jenks
Attorney

Witness
Herbert E. Covey

Patented Nov. 22, 1949

2,489,223

UNITED STATES PATENT OFFICE 2,489,223

ANTICOLLISION APPARATUS

Robert J. Herbold, Denver, Colo., assignor to Lafayette M. Hughes, Denver, Colo.

Application June 25, 1946, Serial No. 679,297

1 Claim. (Cl. 250—208)

This invention relates to collision warning apparatus, and more particularly to a device which warns the pilot of a craft of the presence of an obstruction ahead, such as another aircraft or a mountain in the line of air flight or a boat or land or a projecting rock that menaces a sea voyage.

Due to a differential absorption of light wave lengths by the atmosphere, the sky of a normal cloudless day appears blue in color, and there is no ambient infrared light except that which comes in a straight line radiation from the sun. Hence, if a phototube, which is sensitive only to infrared light, is pointed at the clear sunless portion of the sky, it is not activated. The earth and solid objects in the air receive this direct infrared radiation from the sun during the daytime, and they re-radiate it. This infrared energy stored by the earth is re-radiated during the entire 24 hours, but it falls off after sunset to a nearly constant minimum value which, however, is substantial and sufficient to activate a sensitive photo element. On the other hand, the light at the blue violet end of the spectrum, which is reflected readily during the daytime, is not re-radiated to a material extent by a solid body as is heat, so that within a cloud which obscures reflected light there is a great difference in activation of a photo element by the light waves at the opposite ends of the spectrum. Likewise, a clear sky at night provides no direct infrared light, except from the astronomical bodies, capable of activating a photosensitive element. The only activation from the night sky light is caused by the short wave lengths, which reduces rapidly after sunset as the twilight recedes. Hence the re-radiated infrared waves from solid bodies are the chief source of photo activation after dark.

A cloud in the sky, as viewed from the outside during the middle portion of the day, disperses and reflects light chiefly as a white color, but that reflected light is predominantly from the visible spectrum and the short wave lengths, and there is only a slight amount of reflected infrared light of the longer wave lengths. Light passing through the cloud is absorbed differentially. If the cloud is very thick, the absorption causes the bottom of the cloud to appear gray or dark and there is a substantial reduction of light within the cloud. It is chiefly the short wave lengths that are absorbed, and the infrared or longer wave lengths penetrate readily to a great distance. Hence the infrared rays can activate a photo element within the cloud, but an element sensitive only to short wave lengths is not affected as strongly. At sunrise or sunset when the sun is low and the light travels substantially horizontally for a long distance through a cloud mass, the short wave lengths are absorbed to a large extent and only the red or longer wave lengths pass through; hence the direct rays from the sun are apparent to an observer chiefly as orange and red. This, however, is during the daytime, when any temporary activation of a photocell need not be misinterpreted.

A mountain or an aircraft in the air is re-radiating infrared light during both the day and the night. When the wave length of the light is long as compared with the diameter of cloud or fog particles, the coefficient of scattering or dispersion of the light decreases inversely with the radius of the particle. Infrared will penetrate readily the normal cloud or fog, as well as pass through the spaces between rain and snow drops; and the infrared will travel through such cloud masses to a considerable distance and activate a sensitive photo element. On the other hand, the ambient sky light of short wave lengths, which is absent and will not affect a photo element during the night darkness, travels only to a reduced extent through fog, cloud, snow, or rain during the day. Consequently, infrared light from solid bodies within or beyond a cloud is the chief source of photo element activation during the night or in a heavy cloud during the day, barring the presence of a beacon or other artificial light. These general conditions apply during both the summer and the winter, since the infrared radiation from the ground is higher than that derived from the atmosphere. Also, this differential light condition is not dependent on the time of the day or night, except as regards the intensities of the light waves. Hence, a photo element sensitive chiefly to the short waves is activated mainly by the direct sky light of the day or night and by the diffused light within a cloud. On the other hand, a photo element sensitive chiefly to infrared rays is activated by an object within a cloud or beyond it that radiates infrared light during the day and the night when the object is within the angle of vision of the photo element.

I propose to employ this differential activation of photo elements by the wave lengths at the opposite ends of the spectrum to determine the location of the horizon or the presence or absence or the position of a solid body, such as a mountain, a craft or other solid substance capable of radiating infrared wave lengths, and particularly to warn a moving craft of an obstruction in its path ahead.

In accordance with this invention, I provide photosensitive apparatus which observes, optically speaking, or is governed by the difference between the sky light and the infrared ground light or light waves emanating from solid objects. This apparatus preferably comprises two photosensitive elements which are respectively sensitive chiefly to light waves at the opposite ends of the spectrum, and I employ the differential activation thereof to indicate the presence of a solid object in the line of movement of craft. These two photo-sensitive elements are preferably so directed as to receive light from the same direction, and they may be so arranged in a balanced circuit that an out of balance condition is set up only when the infrared sensitive element observes a solid object which is radiating the long wave length of light.

Referring to the drawings which illustrate one embodiment of this invention useful for detecting an obstruction in the line of flight of an aircraft:

Fig. 1 is an isometric view of the observing apparatus;

Fig. 2 is a diagrammatic showing of its use;

Fig. 3 is a fragmentary vertical section through one of the observing tubes;

Fig. 4 is a fragmentary top plan view of the device of Fig. 1;

Figure 5:
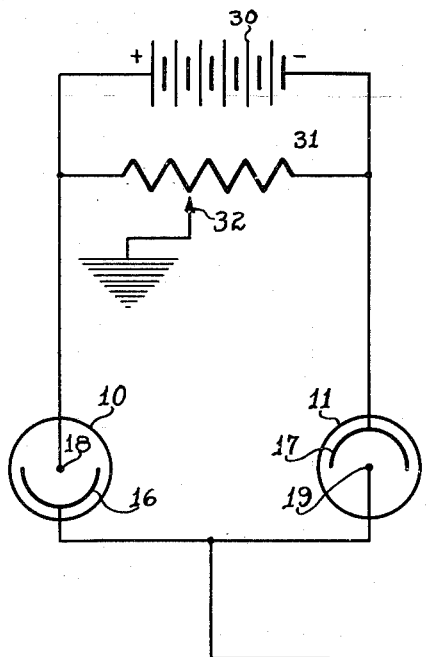
Fig. 5 is a front view of the observing tubes detached from the casing which carries the electronic circuits.
Figure 5:
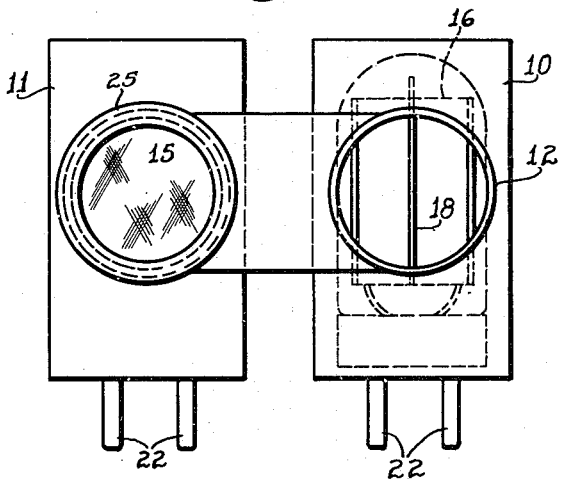

The illustrated embodiment of this invention comprises two photoelectric cells 10 and 11 which are preferably similar in characteristics, except that one is activated primarily by infrared light or waves of the longer lengths, while the other element is activated primarily by the short wave lengths. The photosensitive elements or cells may be of any suitable type, such as a photoemissive tube, a photovoltaic cell or a photoresistance element, and they are preferably arranged in an electrical bridge circuit which is balanced for sky light conditions so that infrared radiation from a solid object causes an unbalance of the bridge, and this unbalanced condition may be employed to control indicating apparatus or other devices which govern the action of either the craft or its pilot. The sensitivity of the photo elements to the two different groups of wave lengths may be obtained by employing an appropriate light filter for either one or both of the elements. For example, the element 10 may receive all of the light from the short to the long waves of the spectrum through an open ended tube 12, while the other element 11 receives light through a similar tube 14 having on its outer end a filter 15 which transmits chiefly the infrared and red rays.

The two photosensitive elements 10 and 11 are shown as standard photoemissive tubes having light activated cathodes 16 and 17 respectively associated with anodes 18 and 19 in suitable light transmitting envelopes. The two phototubes are mounted at the ends of the long opaque walled light conductors or tubes 12 and 14 of equal dimensions arranged preferably with parallel axes so that their open ends point in the same direction and receive and direct narrow pencils of light rays from the same space area to the sensitive elements of the photocells. These tubes 12 and 14 may each be at least a foot long and an inch or more in diameter when used with a photoemissive tube of standard make. The two photoemissive tubes 10 and 11 are enclosed within light shielding casings 20 and 21, and the conducting prongs 22 of the cells (Fig. 3) project through the bottoms of the casings for plugging into the contact sockets of the electric circuits mounted in the supporting casing 24.

The filter 15 may be a Wratten filter No. 88 having a gelatin body dyed with an organic substance which transmits red and infrared light, and especially light waves above 7000 Angstrom units, but absorbs the higher wave lengths. The filter may be made of various materials provided with a color absorbing pigment or dye which eliminates most of the undesired wave lengths but passes the infrared. It is also feasible to employ a filter for the other tube which passes only the short wave lengths at the blue violet end of the spectrum. In that case one tube receives only the short waves while the other tube is activated by all of the wave lengths. This gives a differential action, since one tube receives no infrared and the other does. Also, an appropriate filter may be used with each photocell, so that one receives only red and infrared and the other only blue and violet; or other spaced bands of light may be employed for the differential action provided only one cell receives infrared light. The filter 15 may be a disk removably held in place over the open end of tube 14 by means of a screw cap 25 having a flanged edge engaging the filter disk and internal screw threads engaging external threads on the tube and thereby clamping the filter disk against the end of the tube. The filter may be otherwise mounted.

If the device of Fig. 1 is pointed only at the sky in the position A of Fig. 2, the two phototubes are in a certain observing relationship in which the sky light is the primary activating agent, and an electrical circuit governed by the two tubes may be balanced for that light activating condition. If the two tubes are tilted or moved to the position B where the observing line of vision is obstructed by a mountain C, then the phototube having the red filter, which in position A was not activated materially, will now receive emanations of infrared from the mountain and so be activated, while the activation of the other tube is decreased because of the reduction of light of short wave lengths. This differential condition may be employed to operate an indicator or to control the movement of the aircraft.

Figure 6:
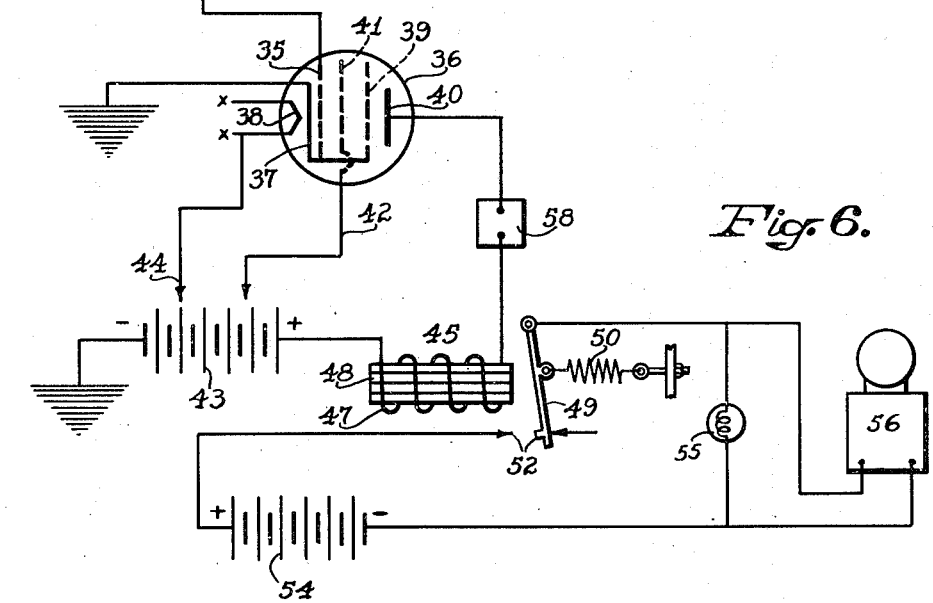
Fig. 6 is a wiring diagram of the circuits.

A suitable electronic circuit for giving an alarm indication of the mountain or another craft in the line of flight is shown in Fig. 6. The two photoemissive tubes 10 and 11, or other appropriate light sensitive elements, are mounted in series with a battery 30 so that one tube forms a load for the other. A potentiometer resistance 31 has its variable contact 32 grounded, and this resistance is connected across the terminals of the battery and between the anode 18 of tube 10 and the sensitive cathode 17 of tube 11. The cathode 16 of tube 10 and the anode 19 of tube 11 are connected to a common terminal that leads to the grid 35 of a suitable amplifier, such as the pentode 36. The cathode 37 of the amplifier is heated by a resistance element 38 in a supplemental D. C. or A. C. circuit. The cathode is grounded to the framework of the aircraft and it is further connected to a screen grid 39 placed in a protective position adjacent to the anode 40 of the pentode. A further suppressor grid 41 is located between the grids 35 and 39, and it is connected through a variable contact 42 with the battery 43 which supplied current through another contact arm 44 to the amplifier circuit.

The negative terminal of this battery is grounded.

The amplifier circuit thus produced by an out of balance condition of the phototube activation is employed to operate a relay 45 or other suitable device that is governed by the photocell observation of the obstruction ahead. This relay may be of standard construction comprising a coil 47 wound about a magnet core 48 which serves when the amplifier circuit is energized to draw the armature 49 against the resistance of a tension spring 50 towards the core and close the switch contacts 52 which provide a circuit between the battery 54 and an electric light 55 and/or a signal bell 56 of standard construction and arrangement.

The photocells 10 and 11 are balanced by varying the position of the potentiometer contact 32. The vacuum phototubes are operated at saturation voltage and the maximum cathode emission for the weakest light condition, and the current voltage characteristics are such that the circuit is very sensitive, and any difference in light reception of the two cathodes gives a large change in voltage. After the circuits have been balanced to a condition of no signal, then any voltage variation at the amplifier grid 35 varies the current in the amplifier circuit. The grid may be normally biased to a negative condition so that when made less negative by the phototube circuit, the electron emission from the heated cathode of the amplifier tube will be greatly increased and provide a current which gives the desired signal. A milliammeter 58 may be arranged in the amplifier tube circuit, in which case the movement of the meter needle may be calibrated to indicate the closeness of the solid body that is radiating infrared. Various constructions may be employed for giving an indication or signal or to control the guidance of the craft.

The cells may be carried on a swinging gyroscopic or double axis mount so arranged as to hold the cells horizontal, or they may be fixed in parallelism so as to point in the direction of flight. If desired, the cell 10 may point at a slight angle upwards so as to receive only the ambient sky light, while the other cell 11 points straight ahead so as to pick up the infrared radiation that comes in the direction of flight. The tubes 12 and 14 of both cells, or of cell 11 only, may be oscillated vertically through a slight angle, either manually or mechanically, so as to indicate the position of the horizon, and thus give the pilot ample warning of any change in configuration of the land ahead. Various mechanical and electrical constructions may be employed for such purposes.

The phototubes 10 and 11 may be made according to standard practice, depending upon the use to which they may be put. The cathode of one standard photoemissive type has a coating of caesium on caesium oxide on a silver backing. An emission of electrons from the cathode is caused by light waves up to about 12,000 Angstrom units. The sensitive medium of a photovoltaic cell may be made of copper oxide or other compounds. An Eby cell which is sensitive to infrared wave lengths, comprises a deposit of a low valence salt of copper or silver on a metal disk. Of the photoconductive cells, I may employ one having a thin coating of selenium on a plate, such as the General Electric FJ–31 selenium tube. I may employ various types of temperature measuring thermocouples. I prefer to employ highly sensitive cells, such as a "thalofide" cell, or a thallium oxygen sulfur cell having a platinum plate coated with a film of thallium metal treated with sulfur and oxygen. Such a cell has a maximum output at about 10,000 Angstrom units and is sensitive up to about 12,000 Angstrom units. It is far more sensitive to infrared waves than the standard caesium oxide emissive types. If the photosensitive element is to be enclosed, infrared light may be admitted through a window of appropriate material, such as rock salt (NaCl) for the longer wave lengths, or ophthalmic crown glass for the shorter infrared waves. Fused or crystal quartz, and for some uses polystyrene, have various degrees of transparency to infrared rays. The crown glass and quartz will transmit light of 3 to 5 microns wave length and styrene will serve up to about 1.5 microns. These materials may be used as windows for any of the photoelectric elements above described, subject to other requirements.

I may also employ photoconductive cells, or photosensitive resistance elements, having other types of photosensitive resistance materials, such as the sulfide, selenide or telluride of lead. The lead sulfide cell has a film of lead sulfide deposited by precipitation from an aqueous NaOH solution of lead acetate and thio-urea on the outer bottom wall and partway up the side of a glass cup. The electric current is conducted to the resistance by means of a film of gold on platinum on the side of the cup. This cup is assembled within an outer cup, with the space therebetween evacuated, like a Thermos bottle. The cup is filled with solid $CO_2$, thus creating a temperature of about —80° C. The sensitivity of the lead sulfide is provided by heating the deposited film in air at 100° C. for ¾ of an hour. This tempered lead sulfide film is sensitive to infrared light up to about 3.5 microns wavelength, with a resistance of about 100,000 ohms, at —80° C. Lead telluride is made sensitive in a tempering operation by heating it in air at 400° to 430° C., which may produce lead tellurate. The electrode terminals are carbon. This material is most sensitive to light between 1 and 4.5 microns and up to 6 microns wavelength, when the temperature is maintained as low as —190° C. Synthetic sapphire windows are transparent to infrared light within this range of wavelengths and may be used.

Two resistance devices of the above described types may be arranged in a balanced circuit as above described, one resistance being shielded by an infrared filter so that it is activated chiefly by infrared rays, while the light to the other is non-filtered, or it is filtered and limited to the short wavelengths. When these strips are arranged in a balanced circuit, a differential activation between the ambient sky light and the radiation from a solid body in the directional path of craft movement gives an indication on the governed electrical apparatus that there is an obstruction ahead.

If only one photosensitive element is employed, it can be made to indicate a difference between sky or ambient light on the one hand and solid body radiation of infrared on the other. This may be accomplished, for example, by moving the infrared sensitive element back and forth from a position where it is activated by the sky to a position where it would receive a solid body radiation. The direction towards which the instrument points at the moment of activation by solid body radiation would give an indication of the location of the horizon and thus warn an aircraft pilot as to his flight conditions. If the tube moved from a horizontal direction upwardly through a slight angle and it gave a uniform reading for both positions, then there would be no solid body obstruction ahead. On the other hand, atmospheric and light conditions may vary materially and irregularly as an aircraft travels through clouds or a boat at sea goes through variable fog conditions. Hence, if but a single instrument is used to observe the infrared radiation from a solid body, it is necessary to calibrate that instrument periodically to negative such variations. This can be done by the pilot pointing the instrument towards the sky and noting the reading, and then when he points the instrument straight ahead in the direction of craft movement, he will see either the same reading as before if there is no obstruction, or a different reading if there is danger ahead of collision with a solid body. The pilot may either observe that variable indication or he may change the needle setting on the indicating instrument to give the sky light condition.

I, however, prefer to employ a balanced circuit arrangement as above described so as to subject both elements to the same ambient light conditions and thus make the apparatus sensitive only to the differential light condition which is the result of solid body radiation. That is, only the change in infrared reception is observed by the combination of the two elements in a balanced bridge circuit. The two photo elements are balanced for any condition of light except that of solid body radiation when an aircraft is flying through fog, rain, snow, dust or any other atmospheric condition. In this way I balance the wavelengths that penetrate such atmospheric conditions against those that do not. Many variations may therefore be made in the arrangements of the photosensitive cells and their filters. For example, if one cell receives all of the light waves, including infrared, and the other only the infrared, an out of balance condition will develop when the infrared is increased by solid body radiation, since the previous bridge balance was adjusted for an absence or a lesser amount of infrared.

The balance in the circuit of Fig. 6 is obtained by pointing both cells at the sky light and adjusting the pontentiometer resistance so as just to give a measurement or signal on the indicator, and then the resistance is backed off slightly to a condition of no signal. This provides a hair trigger balance. If now an aircraft or a mountain comes into the line of sight of the two cells, the infrared therefrom upsets the balance and the indicator gives a signal. As the craft goes through clouds of different densities, the light conditions change, but this does not matter, since both cells are affected alike and the balance is set for an increased reception of infrared by one cell only. If cell 10 carries a filter which transmits violet and blue or short wave light, and the other cell has no filter, the net effect is the same. The filtered cell shows a loss of activation when pointed towards the ground, since the cell was formerly activated by the ambient sky light but does not receive that light from the ground; whereas the other cell receives no infrared from the sky but is activated by the heat waves radiated from the ground and so this cell gains in output.

Various modifications may be made in this apparatus, as will now be apparent to one skilled in the art, hence the above disclosure is to be interpreted as setting forth the principles of this invention and preferred embodiments thereof, and not as imposing limitations on the appended claim.

I claim:

Anti-collision apparatus for a craft comprising two photosensitive elements, one of which is sensitive primarily to infrared rays, the other being sensitive to the short wave lengths of the normal sky light, means including a long tube for shielding the elements laterally and transmitting to the infra-red sensitive element a pencil of light from a narrow space area, a mount for maintaining the elements on the craft in a fixed relationship and holding them immovably directed towards a space area directly ahead of the craft during the operation thereof, a light filter for at least one of the elements to cause the infra-red sensitive element to be activated primarily by light waves above 7,000 Angstrom units, while the other is activated by the short wave lengths of the normal sky light, an electrical bridge circuit including the two elements which is balanced for sky light, an amplifier tube having its grid potential governed by said circuit, and electrical apparatus which responds to the differential activation of the elements, respectively, by ambient sky light and by infra-red light reflected from a solid body in the field of said space area.

ROBERT J. HERBOLD.

REFERENCES CITED

The following references are of record in the file of this patent:

UNITED STATES PATENTS

| Number | Name | Date |
|---|---|---|
| 1,542,937 | Hammond | June 23, 1925 |
| 1,546,264 | Story, Jr. | July 14, 1925 |
| 1,963,185 | Wilson | June 19, 1934 |
| 1,983,882 | Rosenfeld | Dec. 11, 1934 |
| 2,013,594 | Zworykin | Sept. 3, 1935 |
| 2,016,036 | Fitzgerald | Oct. 1, 1935 |
| 2,114,163 | Bird | Apr. 12, 1938 |
| 2,206,036 | Herson | July 2, 1940 |
| 2,350,820 | Rettinger | June 6, 1944 |
| 2,390,739 | Scherbatskoy | Dec. 11, 1945 |

FOREIGN PATENTS

| Number | Country | Date |
|---|---|---|
| 518,211 | Great Britain | Feb. 21, 1940 |